(12) United States Patent
Chiu et al.

(10) Patent No.: US 11,776,219 B2
(45) Date of Patent: Oct. 3, 2023

(54) AUGMENTED REALITY GLASSES

(71) Applicant: Acer Incorporated, New Taipei (TW)

(72) Inventors: Yi-Jung Chiu, New Taipei (TW);
Shih-Ting Huang, New Taipei (TW);
Yen-Hsien Li, New Taipei (TW);
Tsung-Wei Tu, New Taipei (TW);
Wei-Kuo Shih, New Taipei (TW)

(73) Assignee: Acer Incorporated, New Taipei (TW)

( * ) Notice: Subject to any disclaimer, the term of this patent is extended or adjusted under 35 U.S.C. 154(b) by 334 days.

(21) Appl. No.: 17/331,638

(22) Filed: May 27, 2021

(65) Prior Publication Data

US 2022/0335692 A1 Oct. 20, 2022

(30) Foreign Application Priority Data

Apr. 20, 2021 (TW) .................................. 110114132

(51) Int. Cl.
*G06T 19/00* (2011.01)
*G02B 27/12* (2006.01)
*G02B 27/01* (2006.01)
*G02B 27/14* (2006.01)

(52) U.S. Cl.
CPC .......... *G06T 19/006* (2013.01); *G02B 27/017* (2013.01); *G02B 27/0172* (2013.01); *G02B 27/123* (2013.01); *G02B 27/142* (2013.01); *G02B 27/145* (2013.01); *G02B 2027/0127* (2013.01); *G02B 2027/0178* (2013.01)

(58) Field of Classification Search
None
See application file for complete search history.

(56) References Cited

U.S. PATENT DOCUMENTS

| 2014/0177023 | A1* | 6/2014 | Gao ..................... G02B 25/001 359/238 |
| 2019/0258063 | A1 | 8/2019 | Hudman |
| 2020/0264436 | A1 | 8/2020 | Wang et al. |
| 2020/0301239 | A1 | 9/2020 | Akkaya et al. |

FOREIGN PATENT DOCUMENTS

| CN | 110824710 | 2/2020 |
| TW | 201937238 | 9/2019 |

* cited by examiner

*Primary Examiner* — Bao-Luan Q Le
*Assistant Examiner* — Danell L Owens
(74) *Attorney, Agent, or Firm* — JCIPRNET (57) ABSTRACT

Augmented reality glasses including a first image source, a second image source and a lens set are provided. The first image source emits a first image beam. The second image source emits a second image beam. The lens set includes a first lens and a second lens and disposed on the path of the image beams. A gap is disposed between the first lens and the second lens. The refractive index of the gap is lower than that of the first lens. The image beams enter the lens set at an incident surface of the lens set, are reflected at a first surface of the first lens, and exit the lens set at an exit surface. The optical path length of the first image beam from the first image source to the eyes is different from that of the second image beam from the second image source to the eyes.

16 Claims, 6 Drawing Sheets

AUGMENTED REALITY GLASSES

CROSS-REFERENCE TO RELATED APPLICATION

This application claims the priority benefit of Taiwanese application serial no. 110114132, filed on Apr. 20, 2021. The entirety of the above-mentioned patent application is hereby incorporated by reference herein and made a part of this specification.

BACKGROUND

Technical Field

The disclosure relates to an optical device, and in particular to augmented reality glasses.

Description of Related Art

With the advancement of display technology, augmented reality display technology has gradually become popular and widely used in people's lives. The augmented reality technology enables the human eye to see the actual object and the virtual image at the same time, and the virtual image can interact with the actual object.

However, the current augmented reality technology still has a lot to be improved, for example, the virtual image cannot focus on the human eye at the same time when interacting with the actual object, and even the virtual image itself may have a vergence-accommodation conflict (VAC) problem. Specifically, when the image light provided by the virtual reality device enters the eyes, the left and right eyes will respectively focus on the virtual image imaging place seen by the left eye and the virtual image imaging place seen by the right eye; however, the brain regards the position where lines of sight of the user's eyes meet as the position of the image. When the focus position of the eyes is different from the position where lines of sight of the user's eyes meet, it will make the human brain confused and easily cause dizziness, which is VAC phenomenon.

The augmented reality glasses in the augmented reality technology also belong to the category of near-eye optics. The overlapping region of the stereoscopic vision angle of human is about 60 degrees, and the field of view of the augmented reality glasses must cover this region. How to present multiple virtual images at the same time is also an issue for augmented reality technology.

SUMMARY

The disclosure provides augmented reality glasses with a large field of view, capable of presenting multiple virtual images at the same time and avoiding vergence-accommodation conflict.

According to an embodiment of the disclosure, augmented reality glasses to be worn in front of an eye of a user are provided. The augmented reality glasses include a first image source, a second image source and at least one lens set. The first image source emits a first image beam. The second image source emits a second image beam. The at least one lens set is disposed on a path of the first image beam and the second image beam. The at least one lens set includes a first lens and a second lens. The first lens has a first surface. The second lens has a second surface. A gap is disposed between the first surface and the second surface, and a refractive index of the gap is lower than a refractive index of the first lens The first image beam and the second image beam enter the at least one lens set at an incident surface of the at least one lens set, are reflected at the first surface of the first lens, exit the at least one lens at an exit surface of the at least one lens set, and then enter the eye An optical path length of the first image beam from the first image source to the eye is different from an optical path length of the second image beam from the second image source to the eye.

Based on the above, the augmented reality glasses according to the embodiments of the disclosure provide multiple different virtual images using the first image source and the second image source, and combine image beams of the first image source and the second image source by the at least one lens set. By making the optical path length of the first image beam different from the optical path length of the second image beam, images with different distances are presented. Furthermore, positions of the first image source and the second image source are adjustable to avoid vergence-accommodation conflict.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
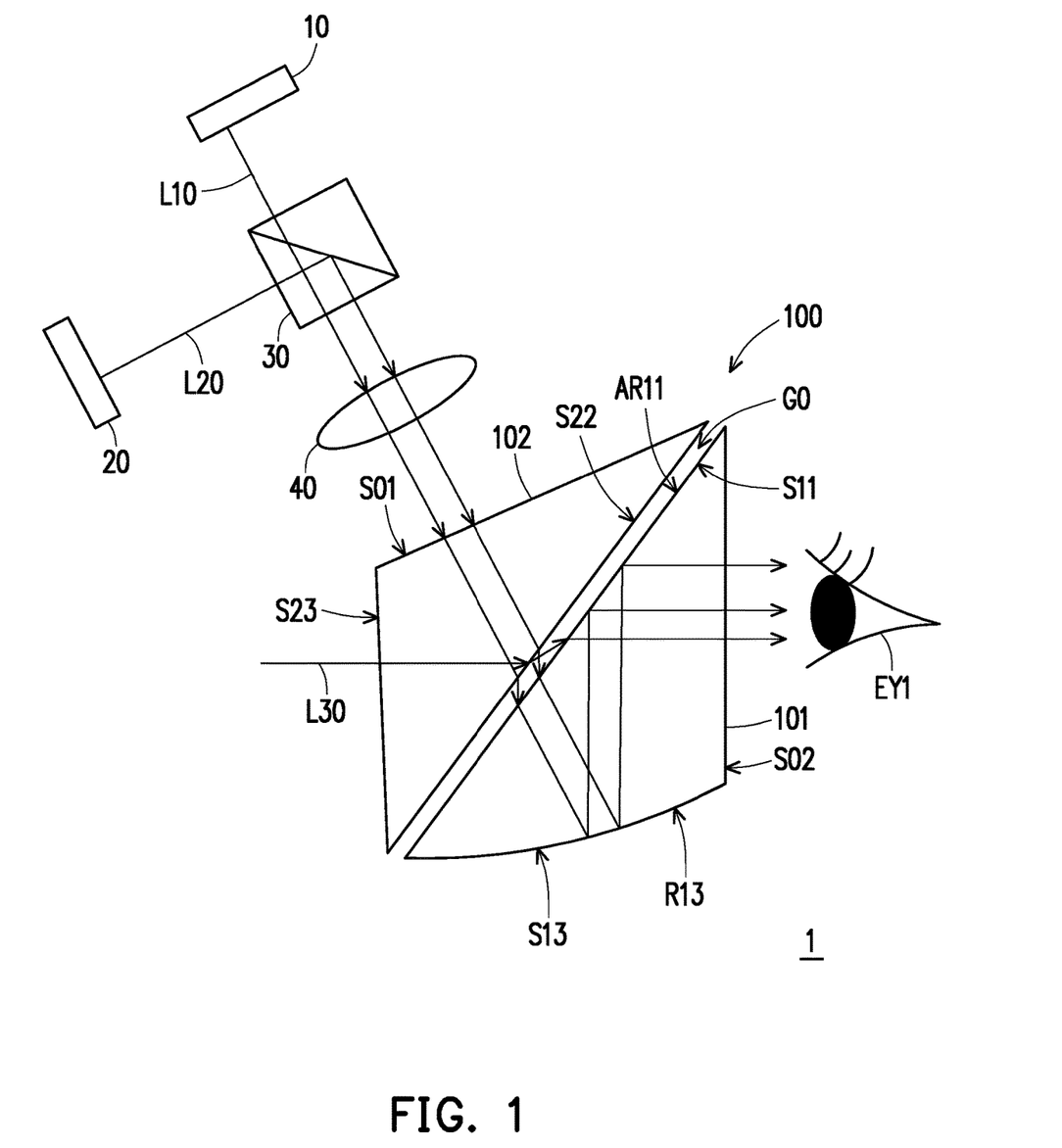
FIG. 1 is augmented reality glasses according to a first embodiment of the disclosure.

With reference to FIG. 1, augmented reality glasses according to a first embodiment of the disclosure are shown. Augmented reality glasses 1 are used to be worn in front of an eye EY1 of a user. The eye EY1 can be a right eye or a left eye of the user. The augmented reality glasses 1 include a first image source 10, a second image source 20, and a lens set 100. The first image source 10 emits a first image beam L10. The second image source 20 emits a second image beam L20. The lens set 100 is disposed on a path of the first image beam L10 and the second image beam L20. The lens set 100 includes a first lens 101, a second lens 102, an incident surface S01, and an exit surface S02.

The first lens 101 has surfaces S11 and S13. The surface S13 is coated with a reflection coating R13, and the reflection coating R13 has high reflectivity. The second lens 102 has a surface S22. A gap G0 is disposed between the surface S11 and the surface S22, and a refractive index of the gap G0 is lower than a refractive index of the first lens 101.

The first image beam L10 emitted by the first image source 10 and the second image beam L20 emitted by the second image source 20 enter the lens set 100 at the incident surface S01 of the lens set 100, enter the gap G0 after transmitting the second lens 102, enter the first lens 101 at the surface S11 of the first lens 101, are reflected at the surface S13 coated with the reflection coating R13, are totally reflected at the surface S11 of the first lens 101, and then enter the eye EY1 after exiting the lens set 100 at the exit surface S02 of the lens set 100.

According to this embodiment, positions of the first image source 10 and the second image source 20 are adjustable, and vergence-accommodation conflict may be avoided by controlling the positions of the first image source 10 and the second image source 20. Specifically, the first image beam L10 emitted by the first image source 10 and the second image beam L20 emitted by the second image source 20 are entered into the right eye and the left eye of the user in the above-mentioned manner. The position of the first image source 10 is controlled so that a position of a virtual image generated by the first image beam L10 is the same as a position where lines of sight of the user's eyes meet to avoid vergence-accommodation conflict. Similarly, a position of the second image source 20 is controlled, so that a position of a virtual image generated by the second image beam L20 is the same as a position where lines of sight of the user's eyes meet to avoid vergence-accommodation conflict. It should be noted that the control of the position of the first image source 10 and the control of the position of the second image source 20 are independent of each other. When the user's eyes look at the virtual image (hereinafter referred to as a first virtual image) generated by the first image beam L10, the position of the first image source 10 is controlled, so that the position of the virtual image generated by the first image beam L10 is the same as the position where the lines of sight of the user's eyes meet. When the user's eyes look at the virtual image (hereinafter referred to as a second virtual image) generated by the second image beam L20, the position of the second image source 20 is controlled, so that the position of the virtual image generated by the second image beam L20 is the same as the position where the lines of sight of the user's eyes meet.

According to this embodiment, by controlling the positions of the first image source 10 and the second image source 20, an optical path length of the first image beam L10 from the first image source 10 to the eye EY1 is different from an optical path length of the second image beam L20 from the second image source 20 to the eye EY1. In this case, the first virtual image and the second virtual image seen by the user will show different distances. However, the disclosure is not limited thereto. The optical path length of the first image beam L10 from the first image source 10 to the eye EY1 may be the same as the optical path length of the second image beam L20 from the second image source 20 to the eye EY1. In this case, the first virtual image and the second virtual image seen by the user will show the same distance.

According to this embodiment, the first image source 10 and the second image source 20 may be, for example, one of a liquid crystal display panel, an organic light emitting diode panel, and a micro light emitting diode panel, but the disclosure is not limited thereto.

It should be noted that, according to this embodiment, the first image beam L10 and the second image beam L20 are totally reflected at the surface S11 of the first lens 101, and then enter the eye EY1 after exiting the lens set 100 at the exit surface S02 of the lens set 100. However, the disclosure is not limited thereto. The first image beam L10 and the second image beam L20 may be partially reflected at the surface S11 of the first lens 101, and then enter the eye EY1 after exiting the lens set 100 at the exit surface S02 of the lens set 100.

In FIG. 1, a physical beam L30 from a real object enters the lens set 100 at a surface S23 of the second lens 102, enters the gap G0 after transmitting the second lens 102, enters the first lens 101 at the surface S11 of the first lens 101, and then enters the eye EY1 after exiting the lens set 100 at the exit surface S02 of the lens set 100.

The lens set 100 may also include an anti-reflection coating AR11, which is disposed on the surface S11 of the first lens 101 to reduce reflectivity of the first image beam L10, the second image beam L20, and the physical beam L30 entering the first lens 101 at the surface S11, and increase transmittance of the first image beam L10, second image beam L20, and the physical beam L30 entering the first lens 101 at the surface S11.

As shown in FIG. 1, the incident surface S01 of the lens set 100 is disposed on the second lens 102, and the exit surface S02 is disposed on the first lens 101. By appropriately configuring a direction of the incident surface S01 on the second lens 102, angles of the first image beam L10 and the second image beam L20 exiting the lens set 100 at the exit surface S02 are controlled.

According to this embodiment, the augmented reality glasses 1 may also include a combiner. The combiner may be implemented as a beam splitter 30 as shown in FIG. 1. The first image beam L10 and the second image beam L20 respectively transmit the beam splitter 30 and enter the lens set 100. However, the disclosure is not limited thereto. According to an embodiment not shown, the beam splitter 30 may not be disposed. The first image source 10 emits the first image beam L10 directly toward the lens set 100, the second image source 20 emits the second image beam L20 toward a reflector (such as a reflecting mirror), and the second image beam L20 is directed toward the lens set 100 after being reflected by the reflector.

The augmented reality glasses 1 may also include a lens 40, which is disposed on the path of the first image beam L10 and the second image beam L20, and is disposed between the beam splitter 30 and the lens set 100. Some optical characteristics of the first image beam L10 and the second image beam L20 may be adjusted by the lens 40, for example, focal lengths of the first image beam L10 and the second image beam L20 are adjusted, so that the first image beam L10 and the second image beam L20 may generate clear virtual images. According to other embodiments, the augmented reality glasses 1 may not include the lens 40.

According to an embodiment of the disclosure, a lens may be disposed between the first image source 10 and the beam splitter 30, and this lens is disposed on a path of the first image beam L10. Some optical characteristics of the first image beam L10 may be adjusted by this lens, for example, the optical path length of the first image beam L10 is changed, thereby changing the distance of the first virtual image seen by the user, or the focal length of the first image beam L10 is adjusted to make the first virtual image clear. However, the disclosure is not limited thereto. The augmented reality glasses 1 may not include the lens disposed between the first image source 10 and the beam splitter 30.

According to an embodiment of the disclosure, a lens may be disposed between the second image source 20 and the beam splitter 30, and this lens is disposed on a path of the second image beam L20. Some optical characteristics of the second image beam L20 may be adjusted by this lens, for example, the optical path length of the second image beam L20 is changed, thereby changing the distance of the second virtual image seen by the user, or the focal length of the second image beam L20 is adjusted to make the second virtual image clear. However, the disclosure is not limited thereto. The augmented reality glasses 1 may not include the lens disposed between the second image source 20 and the beam splitter 30.

According to some embodiments of the disclosure, the augmented reality glasses 1 are provided with the lens 40, but the lens between the first image source 10 and the beam splitter 30 and the lens between the second image source 20 and the beam splitter 30 are not provided. According to some embodiments of the disclosure, the augmented reality glasses 1 are provided with the lens 40 and the lens between the first image source 10 and the beam splitter 30, but the lens between the second image source 20 and the beam splitter 30 is not provided. According to some embodiments of the disclosure, the augmented reality glasses 1 are provided with the lens 40 and the lens between the second image source 20 and the beam splitter 30, but the lens between the first image source 10 and the beam splitter 30 is not provided. According to some embodiments of the disclosure, the augmented reality glasses 1 are provided with the lens between the first image source 10 and the beam splitter 30 and the lens between the second image source 20 and the beam splitter 30, but the lens 40 is not provided. According to some embodiments of the disclosure, the augmented reality glasses 1 are provided with the lens 40, the lens between the first image source 10 and the beam splitter 30, and the lens between the second image source 20 and the beam splitter 30.

A width of the gap G0 in the lens set 100 is between 0.3 mm and 0.6 mm. If the width of the gap G0 is less than 0.3 mm, a diffraction phenomenon such as Newton's rings may occur. If the width of gap G0 is greater than 0.6 mm, stray light or ghost image may occur.

Figure 2:
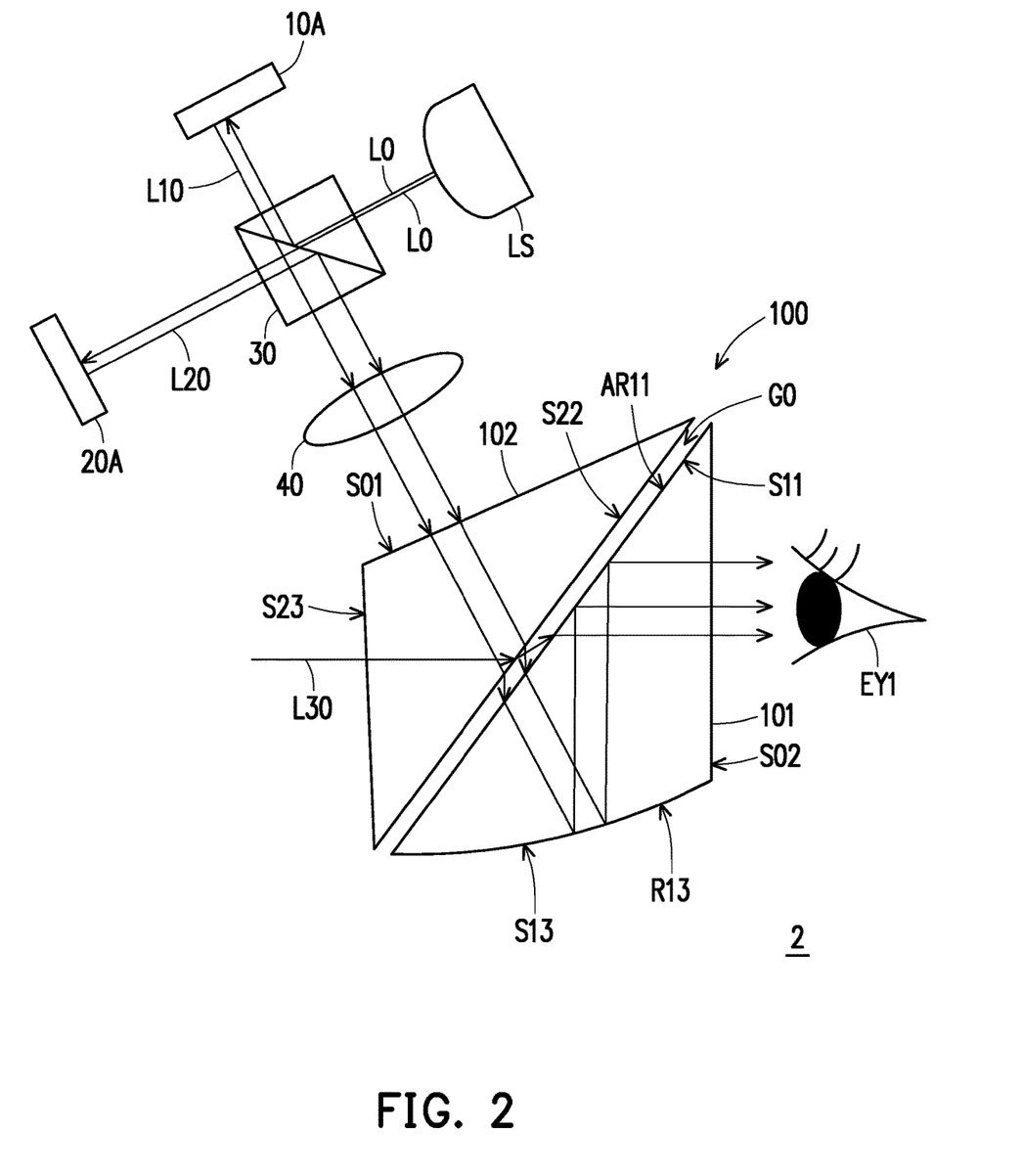
FIG. 2 is augmented reality glasses according to a second embodiment of the disclosure.

With reference to FIG. 2, augmented reality glasses according to a second embodiment of the disclosure are shown. Augmented reality glasses 2 are used to be worn in front of an eye EY1 of a user. The eye EY1 can be a right eye or a left eye of the user. The augmented reality glasses 2 include a light source LS, a first image source 10A, a second image source 20A, and a lens set 100. The light source LS provides an illumination beam L0 to the first image source 10A and the second image source 20A. The first image source 10A and the second image source 20A are, for example, reflective displays. The illumination beam L0 is reflected at the first image source 10A to generate a first image beam L10. The illumination beam L0 is reflected at the second image source 20A to generate a second image beam L20. The lens set 100 is disposed on a path of the first image beam L10 and the second image beam L20. The lens set 100 includes a first lens 101, a second lens 102, an incident surface S01, and an exit surface S02.

The first lens 101 has surfaces S11 and S13. The surface S13 is coated with a reflection coating R13, and the reflection coating R13 has high reflectivity. The second lens 102 has a surface S22. A gap G0 is disposed between the surface S11 and the surface S22, and a refractive index of the gap G0 is lower than a refractive index of the first lens 101.

The first image beam L10 and the second image beam L20 enter the lens set 100 at the incident surface S01 of the lens set 100, enter the gap G0 after transmitting the second lens 102, enter the first lens 101 at the surface S11 of the first lens 101, are reflected at the surface S13 coated with the reflection coating R13, are totally reflected at the surface S11 of the first lens 101, and then enter the eye EY1 after exiting the lens set 100 at the exit surface S02 of the lens set 100.

According to this embodiment, positions of the first image source 10A and the second image source 20A are adjustable, and vergence-accommodation conflict may be avoided by controlling the positions of the first image source 10A and the second image source 20A. Specifically, the first image beam L10 emitted by the first image source 10A and the second image beam L20 emitted by the second image source 20A are entered into the right eye and the left eye of the user in the above-mentioned manner. The position of the first image source 10A is controlled, so that a position of a virtual image generated by the first image beam L10 is the same as a position where lines of sight of the user's eyes meet to avoid vergence-accommodation conflict. Similarly, a position of the second image source 20A is controlled, so that a position of a virtual image generated by the second image beam L20 is the same as a position where lines of sight of the user's eyes meet to avoid vergence-accommodation conflict. It should be noted that the control of the position of the first image source 10A and the control of the position of the second image source 20A are independent of each other. When the user's eyes look at the virtual image (hereinafter referred to as a first virtual image) generated by the first image beam L10, the position of the first image source 10A is controlled, so that the position of the virtual image generated by the first image beam L10 is the same as the position where the lines of sight of the user's eyes meet. When the user's eyes look at the virtual image (hereinafter referred to as a second virtual image) generated by the second image beam L20, the position of the second image source 20A is controlled, so that the position of the virtual image generated by the second image beam L20 is the same as the position where the lines of sight of the user's eyes meet.

According to this embodiment, by controlling the positions of the first image source 10A and the second image source 20A, an optical path length of the first image beam L10 from the first image source 10A to the eye EY1 is different from an optical path length of the second image beam L20 from the second image source 20A to the eye EY1. In this case, the first virtual image and the second virtual image seen by the user will show different distances. However, the disclosure is not limited thereto. The optical path length of the first image beam L10 from the first image source 10A to the eye EY1 may be the same as the optical path length of the second image beam L20 from the second image source 20A to the eye EY1. In this case, the first virtual image and the second virtual image seen by the user will show the same distance.

According to this embodiment, the first image source 10A and the second image source 20A may be, for example, one of a reflective liquid crystal display panel and a liquid crystal on silicon display, but the disclosure is not limited thereto.

It should be noted that, according to this embodiment, the first image beam L10 and the second image beam L20 are totally reflected at the surface S11 of the first lens 101, and then enter the eye EY1 after exiting the lens set 100 at the exit surface S02 of the lens set 100. However, the disclosure is not limited thereto. The first image beam L10 and the second image beam L20 may be partially reflected at the surface S11 of the first lens 101, and then enter the eye EY1 after exiting the lens set 100 at the exit surface S02 of the lens set 100.

In FIG. 2, a physical beam L30 from a real object enters the lens set 100 at a surface S23 of the second lens 102, enters the gap G0 after transmitting the second lens 102, enters the first lens 101 at the surface S11 of the first lens 101, and then enters the eye EY1 after exiting the lens set 100 at the exit surface S02 of the lens set 100.

The lens set 100 may also include an anti-reflection coating AR11, which is disposed on the surface S11 of the first lens 101 to reduce reflectivity of the first image beam L10, the second image beam L20, and the physical beam L30 entering the first lens 101 at the surface S11, and increase transmittance of the first image beam L10, second image beam L20, and the physical beam L30 entering the first lens 101 at the surface S11.

As shown in FIG. 1, the incident surface S01 of the lens set 100 is disposed on the second lens 102, and the exit surface S02 is disposed on the first lens 101. By appropriately configuring a direction of the incident surface S01 on the second lens 102, angles of the first image beam L10 and the second image beam L20 exiting the lens set 100 at the exit surface S02 are controlled.

According to this embodiment, the augmented reality glasses 2 may also include a combiner. The combiner may be implemented as a beam splitter 30 as shown in FIG. 2. The light source LS provides the illumination beam L0 to the first image source 10A and the second image source 20A through the beam splitter 30 respectively. The illumination beam L0 is reflected at the first image source 10A to generate the first image beam L10. The first image beam L10 enters the lens set 100 after transmitting the beam splitter 30. The illumination beam L0 is reflected at the second image source 20A to generate the second image beam L20. The second image beam L20 enters the lens set 100 after transmitting the beam splitter 30. According to another embodiment, a polarization beam splitter may also be used to replace the beam splitter 30 in FIG. 2. At this time, the illumination beam L0 is divided by the polarization beam splitter into a S polarization beam transmitted to the first image source 10A and a P polarization beam transmitted to the second image source 20A. The first image beam L10 passing through the polarization beam splitter is a P-polarized light, and the second image beam L20 reflected by the polarization beam splitter is a S-polarized light.

The augmented reality glasses 2 may also include a lens 40, which is disposed on the path of the first image beam L10 and the second image beam L20, and is disposed between the beam splitter 30 and the lens set 100. Some optical characteristics of the first image beam L10 and the second image beam L20 may be adjusted by the lens 40, for example, focal lengths of the first image beam L10 and the second image beam L20 are adjusted, so that the first image beam L10 and the second image beam L20 may generate clear virtual images. According to other embodiments, the augmented reality glasses 2 may not include the lens 40.

According to an embodiment of the disclosure, a lens may be disposed between the first image source 10A and the beam splitter 30, and this lens is disposed on a path of the first image beam L10. Some optical characteristics of the first image beam L10 may be adjusted by this lens, for example, the optical path length of the first image beam L10 is changed, thereby changing the distance of the first virtual image seen by the user, or the focal length of the first image beam L10 is adjusted to make the first virtual image clear. However, the disclosure is not limited thereto. The augmented reality glasses 2 may not include the lens disposed between the first image source 10A and the beam splitter 30.

According to an embodiment of the disclosure, a lens may be disposed between the second image source 20A and the beam splitter 30, and this lens is disposed on a path of the second image beam L20. Some optical characteristics of the second image beam L20 may be adjusted by this lens, for example, the optical path length of the second image beam L20 is changed, thereby changing the distance of the second virtual image seen by the user, or the focal length of the second image beam L20 is adjusted to make the second virtual image clear. However, the disclosure is not limited thereto. The augmented reality glasses 2 may not include the lens disposed between the second image source 20A and the beam splitter 30.

According to some embodiments of the disclosure, the augmented reality glasses 2 are provided with the lens 40, but the lens between the first image source 10A and the beam splitter 30 and the lens between the second image source 20A and the beam splitter 30 are not provided. According to some embodiments of the disclosure, the augmented reality glasses 2 are provided with the lens 40 and the lens between the first image source 10A and the beam splitter 30, but the lens between the second image source 20A and the beam splitter 30 is not provided. According to some embodiments of the disclosure, the augmented reality glasses 2 are provided with the lens 40 and the lens between the second image source 20A and the beam splitter 30, but the lens between the first image source 10A and the beam splitter 30 is not provided. According to some embodiments of the disclosure, the augmented reality glasses 2 are provided with the lens between the first image source 10A and the beam splitter 30 and the lens between the second image source 20A and the beam splitter 30, but the lens 40 is not provided. According to some embodiments of the disclosure, the augmented reality glasses 2 are provided with the lens 40, the lens between the first image source 10A and the beam splitter 30, and the lens between the second image source 20A and the beam splitter 30.

A width of the gap G0 in the lens set 100 is between 0.3 mm and 0.6 mm. If the width of the gap G0 is less than 0.3 mm, a diffraction phenomenon such as Newton's rings may occur. If the width of gap G0 is greater than 0.6 mm, stray light or ghost image may occur.

Figure 3:
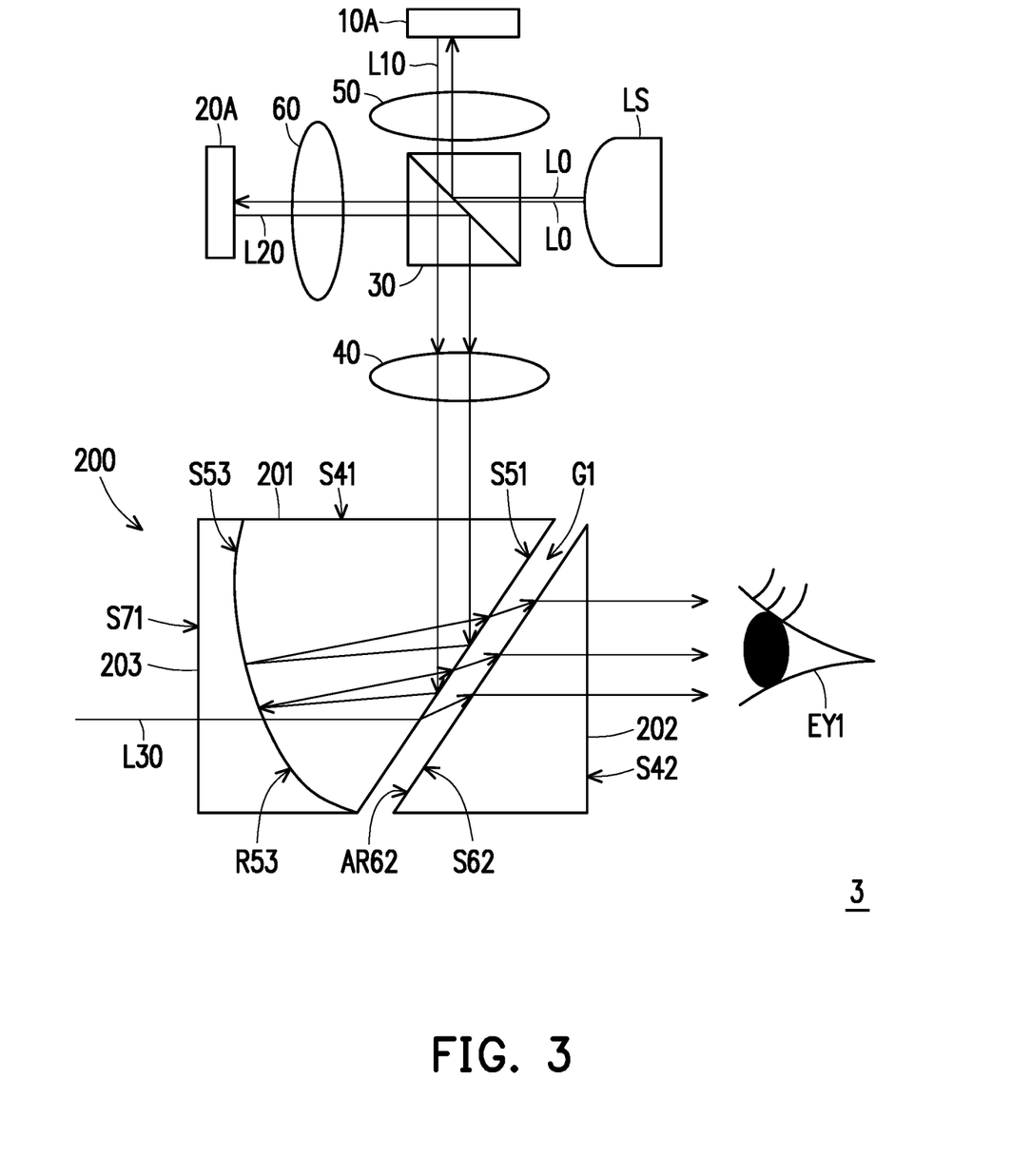
FIG. 3 is augmented reality glasses according to a third embodiment of the disclosure.

With reference to FIG. 3, augmented reality glasses according to a third embodiment of the disclosure are shown. Augmented reality glasses 3 are used to be worn in front of an eye EY1 of a user. The eye EY1 can be a right eye or a left eye of the user. The augmented reality glasses 3 include a light source LS, a first image source 10A, a second image source 20A, and a lens set 200. The light source LS provides an illumination beam L0 to the first image source 10A and the second image source 20A. The first image source 10A and the second image source 20A are, for example, reflective displays. The illumination beam L0 is reflected at the first image source 10A to generate a first image beam L10. The illumination beam L0 is reflected at the second image source 20A to generate a second image beam L20. The lens set 200 is disposed on a path of the first image beam L10 and the second image beam L20. The lens set 200 includes a first lens 201, a second lens 202, a third lens 203, an incident surface S41, and an exit surface S42.

The first lens 201 has surfaces S51 and S53. The surface S53 is coated with a partial reflection coating R53, and the third lens 203 is joined to the first lens 201 by the surface S53. The partial reflection coating R53 is disposed between the surface S53 of the first lens 201 and the third lens 203. The second lens 202 has a surface S62. A gap G1 is disposed between the surface S51 and the surface S62, and a refractive index of the gap G1 is lower than a refractive index of the first lens 201.

The first image beam L10 and the second image beam L20 enter the lens set 200 at the incident surface S41 of the lens set 200, go to the surface S53 of the first lens 201 after being totally reflected at the surface S51 of the first lens 201, and are partially reflected or partially transmit at the surface S53 of the first lens 201. The first image beam L10 and second image beam L20 partially reflected then go to the surface S51 of the first lens 201, enter the gap G1 after transmitting the surface S51 of the first lens 201, then transmit the second lens 202, and enter the eye EY1 after exiting the exit surface S42 of the lens set 200.

According to this embodiment, positions of the first image source 10A and the second image source 20A are adjustable, and vergence-accommodation conflict may be avoided by controlling the positions of the first image source 10A and the second image source 20A. Specifically, the first image beam L10 emitted by the first image source 10A and the second image beam L20 emitted by the second image source 20A are entered into the right eye and the left eye of the user in the above-mentioned manner. The position of the first image source 10A is controlled, so that a position of a virtual image generated by the first image beam L10 is the same as a position where lines of sight of the user's eyes meet to avoid vergence-accommodation conflict. Similarly, a position of the second image source 20A is controlled, so that a position of a virtual image generated by the second image beam L20 is the same as a position where lines of sight of the user's eyes meet to avoid vergence-accommodation conflict. It should be noted that the control of the position of the first image source 10A and the control of the position of the second image source 20A are independent of each other. When the user's eyes look at the virtual image (hereinafter referred to as a first virtual image) generated by the first image beam L10, the position of the first image source 10A is controlled, so that the position of the virtual image generated by the first image beam L10 is the same as the position where the lines of sight of the user's eyes meet. When the user's eyes look at the virtual image (hereinafter referred to as a second virtual image) generated by the second image beam L20, the position of the second image source 20A is controlled, so that the position of the virtual image generated by the second image beam L20 is the same as the position where the lines of sight of the user's eyes meet.

The augmented reality glasses 3 may also include lenses 50 and 60, enter lens set 200 after the first image beam L10 transmit lens 50, and enter lens set 200 after the second image beam L20 transmit lens 60. The optical path length of the first image beam L10 and the second image beam L20 can be adjusted by the lenses 50 and 60. However, the disclosure is not limited to this, and other optical characteristics of the first image beam L10 and second image beam L20 can be adjusted by lenses 50 and 60, for example, adjusting the focal lengths of the first image beam L10 and the second image beam L20, so that the first image beam L10 and the second image beam L20 may generate clear virtual images.

When the user's eyes look at the first virtual image, the lens 50 may be used to make a position of the virtual image generated by the first image beam L10 same as a position where the user's eyes meet to avoid vergence-accommodation conflict. When the user's eyes are look at the second virtual image, the lens 60 may be used to make a position of the virtual image generated by the second image beam L20 same as a position where the user's eyes meet to avoid vergence-accommodation conflict.

According to this embodiment, by controlling the positions of the first image source 10A and the second image source 20A, an optical path length of the first image beam L10 from the first image source 10A to the eye EY1 is different from an optical path length of the second image beam L20 from the second image source 20A to the eye EY1. In this case, the first virtual image and the second virtual image seen by the user will show different distances. However, the disclosure is not limited thereto. The optical path length of the first image beam L10 from the first image source 10A to the eye EY1 may be the same as the optical path length of the second image beam L20 from the second image source 20A to the eye EY1. In this case, the first virtual image and the second virtual image seen by the user will show the same distance.

According to this embodiment, the first image source 10A and the second image source 20A may be, for example, one of a reflective liquid crystal display panel and a liquid crystal on silicon display, but the disclosure is not limited thereto.

It should be noted that, according to this embodiment, the first image beam L10 and the second image beam L20 are totally reflected at the surface S51 of the first lens 101. However, the disclosure is not limited thereto. The first image beam L10 and the second image beam L20 may be partially reflected or partially transmit the surface S51 of the first lens 101.

In FIG. 3, a physical beam L30 from a real object enters the lens set 200 at a surface S71 of the third lens 203, enters the gap G1 after transmitting the third lens 203 and the first lens 201, enters the second lens 202 at the surface S62 of the second lens 202, and then enters the eye EY1 after exiting the lens set 300 at the exit surface S42 of the lens set 200. The third lens 203 is disposed to correct aberrations caused by the first lens 201 and the second lens 202 to the physical beam L30.

The lens set 200 may also include an anti-reflection coating AR62, which is disposed on the surface S62 of the first lens 202 to reduce reflectivity of the first image beam L10, the second image beam L20, and the physical beam L30 entering the first lens 202 at the surface S62, and increase transmittance of the first image beam L10, second image beam L20, and the physical beam L30 entering the first lens 202 at the surface S62.

As shown in FIG. 3, the incident surface S41 of the lens set 200 is disposed on the first lens 201, and the exit surface S42 is disposed on the second lens 202. By appropriately configuring a direction of the incident surface S42 on the first lens 201, angles of the first image beam L10 and the second image beam L20 exiting the lens set 200 at the exit surface S42 are controlled.

According to this embodiment, the augmented reality glasses 3 may also include a combiner. The combiner may be implemented as a beam splitter 30. The light source LS provides the illumination beam L0 to the first image source 10A and the second image source 20A through the beam splitter 30 respectively. The illumination beam L0 is reflected at the first image source 10A to generate the first image beam L10. The first image beam L10 enters the lens set 200 after transmitting the beam splitter 30. The illumination beam L0 is reflected at the second image source 20A to generate the second image beam L20. The second image beam L20 enters the lens set 200 after transmitting the beam splitter 30.

The augmented reality glasses 3 may also include a lens 40, which is disposed on the path of the first image beam L10 and the second image beam L20, and is disposed between the beam splitter 30 and the lens set 200. Some optical characteristics of the first image beam L10 and the second image beam L20 may be adjusted by the lens 40, for example, focal lengths of the first image beam L10 and the second image beam L20 are adjusted, so that the first image beam L10 and the second image beam L20 may generate clear virtual images. According to other embodiments, the augmented reality glasses 3 may not include the lens 40.

According to some embodiments of the disclosure, the augmented reality glasses 3 are provided with the lens 40, but the lens 50 and the lens 60 are not provided. According to some embodiments of the disclosure, the augmented reality glasses 3 are provided with the lens 40 and the lens 50, but the lens 60 is not provided. According to some embodiments of the disclosure, the augmented reality glasses 3 are provided with the lens 40 and the lens 60, but the lens 50 is not provided. According to some embodiments of the disclosure, the augmented reality glasses 3 are provided with the lens 50 and the lens 60, but the lens 40 is not provided. According to some embodiments of the disclosure, the augmented reality glasses 3 are provided with the lens 40, the lens 50, and the lens 60.

A width of the gap G1 in the lens set 200 is between 0.3 mm and 0.6 mm. If the width of the gap G1 is less than 0.3 mm, a diffraction phenomenon such as Newton's rings may occur. If the width of gap G1 is greater than 0.6 mm, stray light or ghost image may occur.

Figure 4A:
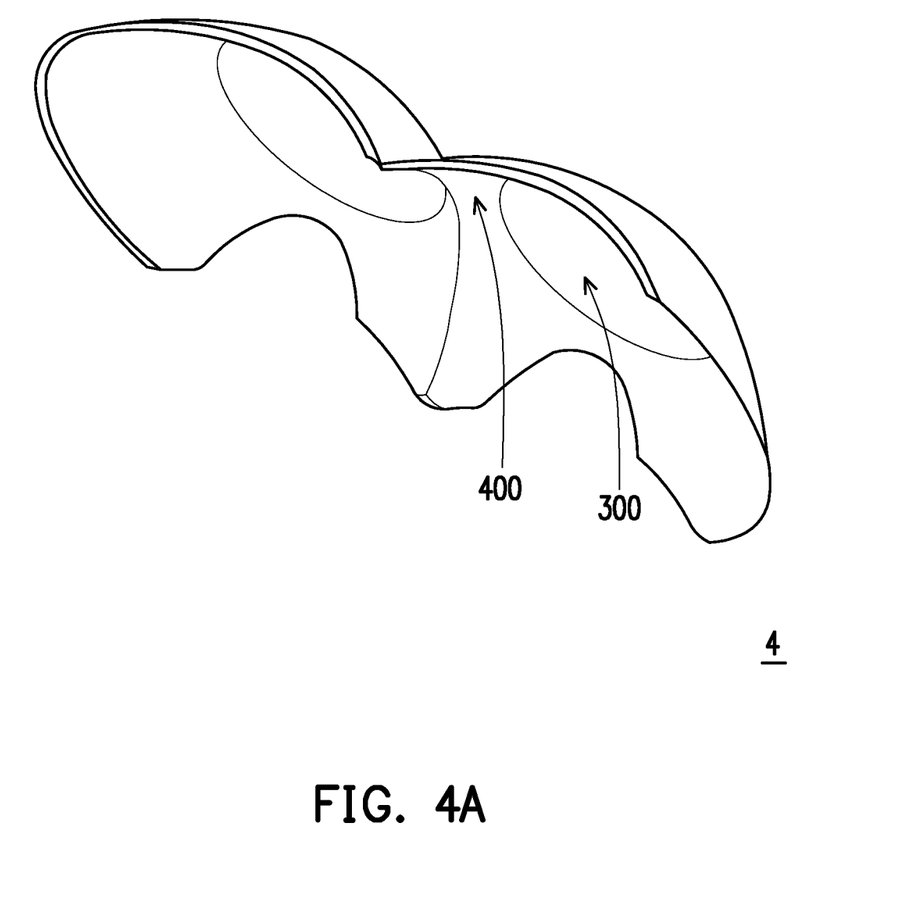
FIG. 4A is a three-dimensional schematic diagram of augmented reality glasses according to embodiments of the disclosure.
Figure 4B:
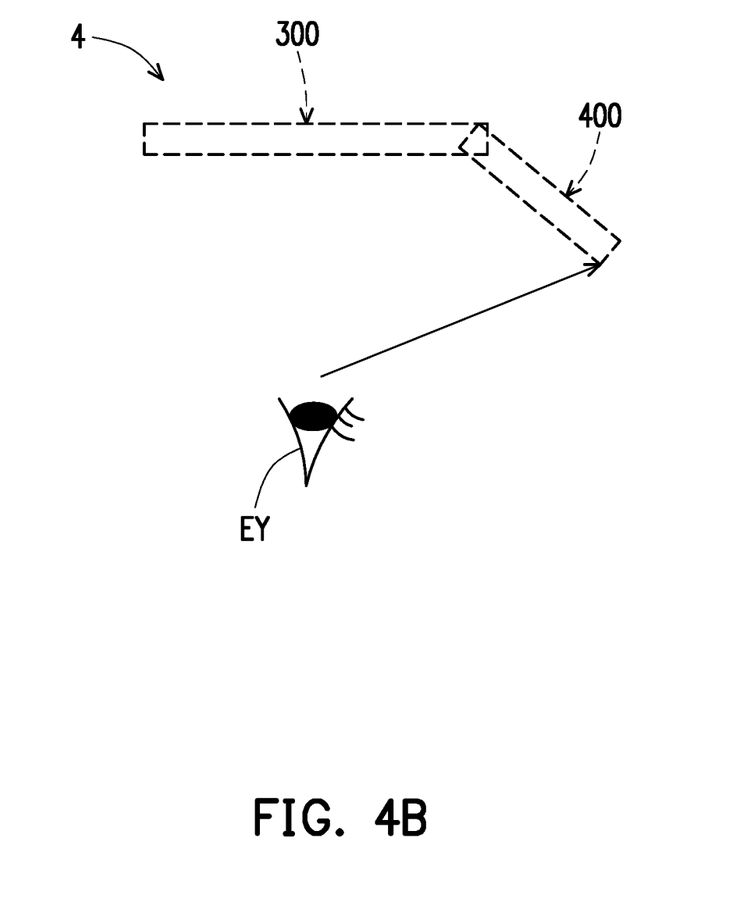
FIG. 4B and FIG. 4C are schematic diagrams when the augmented reality glasses shown in FIG. 4A are worn in front of the user's eyes.
Figure 4C:
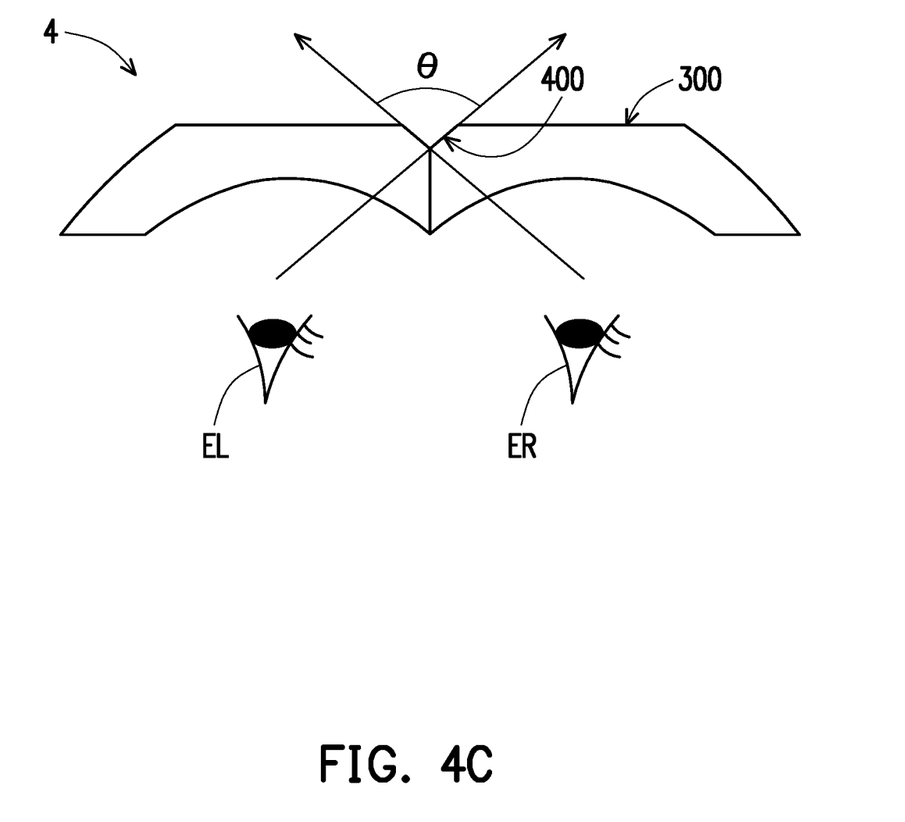

Next, with reference to FIG. 4A to FIG. 4C, FIG. 4A is a three-dimensional schematic diagram of augmented reality glasses according to embodiments of the disclosure, and FIG. 4B and FIG. 4C are schematic diagrams when the augmented reality glasses shown in FIG. 4A are worn in front of the user's eyes.

Augmented reality glasses 4 include a lens set 300 and a lens set 400. The lens set 300 is worn in a straight view direction of the user's right eye ER and left eye EL, and the lens set 400 is worn on a nose wings side of the user. An optical axis of the lens set 300 and an optical axis of the lens set 400 are not parallel to each other, as shown in FIG. 4B. In addition, the lens set 100 or 200 according to the first to third embodiments may be an implementation of the lens set 300 and 400 according to this embodiment.

By wearing the lens sets 300 and 400 in the straight view direction of the user and the nose wings side of the user, field of view of the augmented reality glasses 4 may overlap a stereoscopic vision angle θ of the user's eyes.

In summary, the augmented reality glasses according to the embodiments of the disclosure provide multiple different virtual images using the first image source and the second image source, and combine image beams of the first image source and the second image source by the at least one lens set. By making the optical path length of the first image beam different from the optical path length of the second image beam, images with different distances are presented. Furthermore, positions of the first image source and the second image source are adjustable to avoid vergence-accommodation conflict.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. Augmented reality glasses to be worn in front of an eye of a user, wherein the augmented reality glasses comprise:
 a first image source emitting a first image beam;
 a second image source emitting a second image beam;
 at least one lens set disposed on a path of the first image beam and the second image beam, wherein the at least one lens set comprises:
  a first lens having a first surface; and
  a second lens having a second surface, wherein a gap is disposed between the first surface and the second surface, and a refractive index of the gap is lower than a refractive index of the first lens,
 wherein the first image beam and the second image beam enter the at least one lens set at an incident surface of the at least one lens set, are reflected at the first surface of the first lens, exit the at least one lens at an exit surface of the at least one lens set, and then enter the eye; an optical path length of the first image beam from the first image source to the eye is different from an optical path length of the second image beam from the second image source to the eye.

2. The augmented reality glasses according to claim 1, wherein the first lens has a third surface, the first image beam and the second image beam are reflected at the third surface after being totally reflected at the first surface of the first lens, and enter the eye after exiting the at least one lens set at the exit surface of the at least one lens set.

3. The augmented reality glasses according to claim 2, wherein the exit surface is disposed on the second lens, and the first lens is disposed to correct angles of the first image beam and the second image beam exiting the at least one lens set at the exit surface.

4. The augmented reality glasses according to claim 2, wherein the at least one lens set further comprises an anti-reflection coating disposed on the second surface of the second lens.

5. The augmented reality glasses according to claim 2, wherein the at least one lens set further comprises a third lens joined to the first lens by the third surface, and the third lens is disposed to correct aberrations of the first lens and the second lens.

6. The augmented reality glasses according to claim 5, wherein the at least one lens set further comprises a partial reflection coating disposed between the third lens and the third surface.

7. The augmented reality glasses according to claim 1, wherein the first lens has a third surface, the first image beam and the second image beam are totally reflected at the first surface of the first lens after being reflected at the third surface, and enter the eye after exiting the at least one lens set at the exit surface of the at least one lens set.

8. The augmented reality glasses according to claim 7, wherein the at least one lens set further comprises an anti-reflection coating disposed on the first surface of the first lens.

9. The augmented reality glasses according to claim 7, wherein the exit surface is disposed on the first lens, and the second lens is disposed to correct angles of the first image beam and the second image beam exiting the at least one lens set at the exit surface.

10. The augmented reality glasses according to claim 7, wherein the at least one lens set further comprises a reflection coating disposed on the third surface of the first lens, and the reflection coating has high reflectivity.

11. The augmented reality glasses according to claim 1 further comprising a combiner, wherein the first image beam and the second image beam enter the at least one lens set after transmitting the combiner, or the first image beam and the second image beam enter the at least one lens set after being reflected at the combiner.

12. The augmented reality glasses according to claim 11 further comprising a third lens disposed on the path of the first image beam and the second image beam, and disposed between the combiner and the at least one lens set.

13. The augmented reality glasses according to claim 1 further comprising a third lens, wherein the first image beam enters the at least one lens set after transmitting the third lens.

14. The augmented reality glasses according to claim 1 further comprising a third lens, wherein the second image beam enters the at least one lens set after transmitting the third lens.

15. The augmented reality glasses according to claim 1, wherein a width of the gap is between 0.3 mm and 0.6 mm.

16. The augmented reality glasses according to claim 1, wherein the at least one lens set comprises two lens sets, one of the two lens sets is worn in a straight view direction of the eye, the other one of the two lens sets is worn on a nose wings side of the user, and optical axes of the two lens sets are not parallel to each other.

* * * * *